(12) United States Patent
Marissal

(10) Patent No.: US 6,596,823 B2
(45) Date of Patent: Jul. 22, 2003

(54) PROCESS FOR MANUFACTURING A POLYOLEFIN RESIN

(75) Inventor: Daniel Marissal, Braine-le-Comte (BE)

(73) Assignee: Solvay Polyolefins Europe-Belgium (Societe Anonyme), Brussels (BE)

(*) Notice: Subject to any disclaimer, the term of this patent is extended or adjusted under 35 U.S.C. 154(b) by 297 days.

(21) Appl. No.: 09/753,557

(22) Filed: Jan. 4, 2001

(65) Prior Publication Data
US 2001/0025088 A1 Sep. 27, 2001

(30) Foreign Application Priority Data
Jan. 18, 2000 (BE) .......................... 2000/0035

(51) Int. Cl.$^7$ .................................................. C08F 2/04
(52) U.S. Cl. .............................. 526/70; 526/64; 526/65; 526/348; 422/132
(58) Field of Search ......................... 526/70, 65, 64, 526/348; 422/132

(56) References Cited

U.S. PATENT DOCUMENTS 3,816,383 A * 6/1974 Stotko ...................... 260/94.9
4,692,501 A 9/1987 Mineshima et al.
5,639,834 A * 6/1997 Debras et al. ................ 526/64
5,723,705 A 3/1998 Herrmann et al.

FOREIGN PATENT DOCUMENTS

| EP | 0 432 555 | 6/1991 |
|---|---|---|
| EP | 0 891 990 | 1/1999 |
| EP | 0 897 934 | 2/1999 |
| GB | 850002 | 9/1960 |
| GB | 1147019 | 4/1969 |
| JP | 03 084013 | 4/1991 |

* cited by examiner

Primary Examiner—David W. Wu
Assistant Examiner—William Cheung
(74) Attorney, Agent, or Firm—Oblon, Spivak, McClelland, Maier & Neustadt, P.C.

(57) ABSTRACT

Continuous process for manufacturing a polyolefin resin in at least two polymerization reactors connected in series, in which the polymer suspensions leaving the reactors are transferred into hydrocyclone separators in which a flow comprising diluent and polymer particles, on the one hand, and a concentrated suspension of polymer particles, on the other hand, are formed and separated. The flows comprising the polymer particles are recycled into the first polymerization reactor.

14 Claims, 1 Drawing Sheet

PROCESS FOR MANUFACTURING A POLYOLEFIN RESIN

Figure 1:
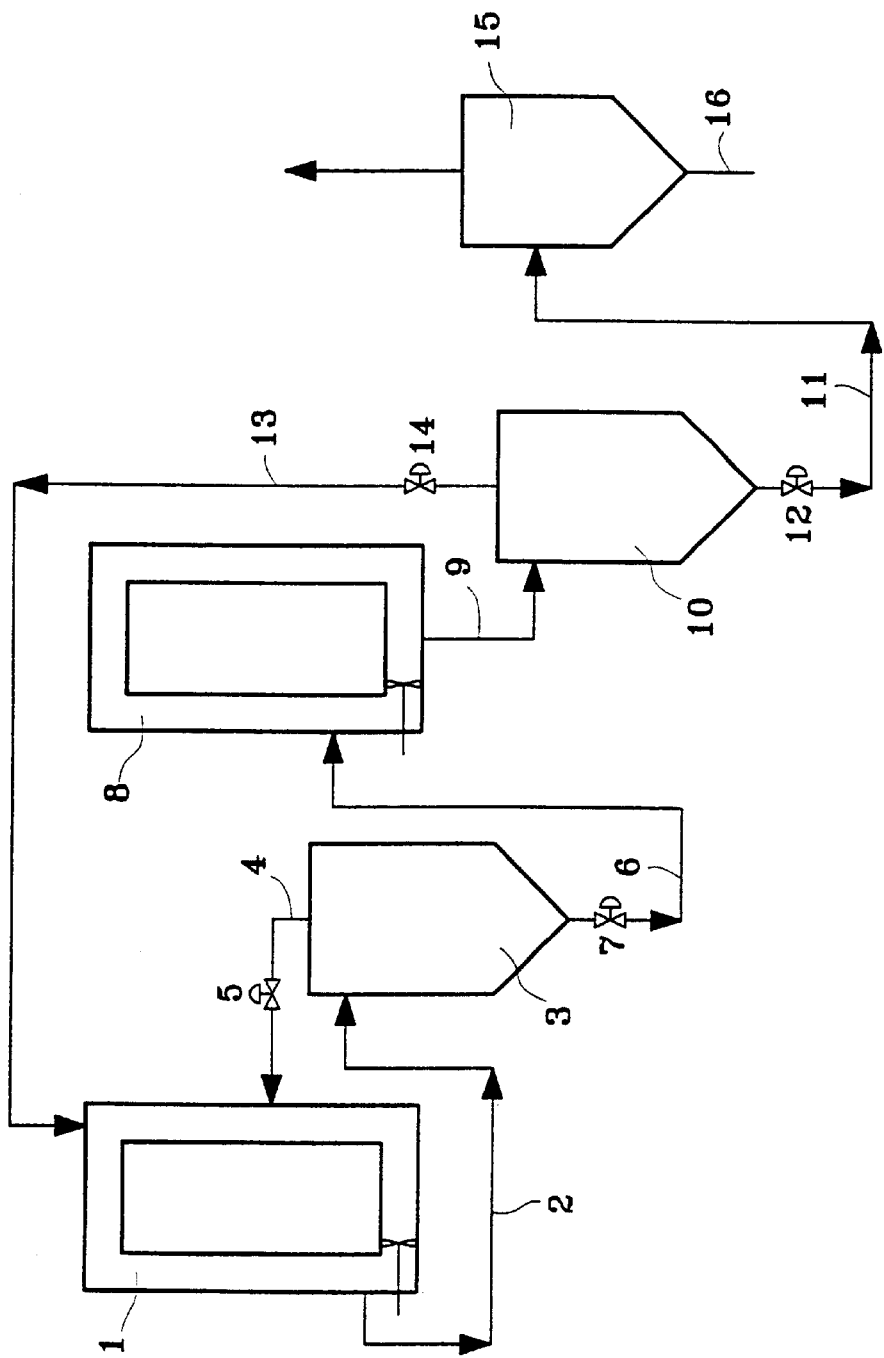

The present invention relates to a continuous process for manufacturing a polyolefin resin of improved homogeneity. The invention also relates to a device for carrying out the process.

The manufacture of polyolefin resins by continuous polymerization in a diluent has been known for a long time. Generally, continuous processes comprise the continuous introduction of an olefin, a catalyst and a diluent into a polymerization reactor and the continuous removal from this reactor of a suspension comprising polyolefin particles and the diluent. These continuous manufacturing processes generally lead to resins whose polymer particles have a certain size distribution as a function of the residence time in the polymerization reactor. The particles of different sizes often also have different properties, such as, for example, the melt flow index and the content of catalytic residues. These properties consequently differ from the average properties of the polyolefin resin obtained, which may pose problems during segregation of resins during transportation or storage. Furthermore, the known manufacturing processes generally give an appreciable fraction of fine particles, which may be detrimental to the storage and to the subsequent use of the resins.

The present invention is directed towards providing a process which does not have the abovementioned drawbacks.

The invention consequently relates to a continuous process for manufacturing a polyolefin resin of improved homogeneity, according to which:

(a) in a polymerization reactor (R) comprising a diluent (D), an olefin is polymerized continuously in the presence of a catalyst to produce a suspension (S) comprising the said diluent (D) and polyolefin particles, (b) a portion of the suspension (S) is taken from the reactor (R), (c) the suspension taken is transferred into a hydrohydrocyclone separator in which a flow (F) comprising diluent (D) and polyolefin particles, on the one hand, and a concentrated suspension (CS) of polyolefin particles, on the other hand, are formed and separated, (d) the flow (F) is taken from the hydrohydrocyclone separator and recycled into the polymerization reactor (R), into step (a), (e) the concentrated suspension (CS) is taken from the hydrohydrocyclone separator and introduced into a subsequent polymerization reactor (R'), fed with olefin to continue the polymerization and to produce a suspension (S') comprising the diluent (D) and polyolefin particles, (f) a portion of the suspension (S') is taken from the subsequent polymerization reactor (R'), (g) the suspension taken is transferred to a hydrocyclone separator in which a flow (F') comprising diluent (D) and polyolefin particles, on the one hand, and a concentrated suspension (CS') of polyolefin particles, on the other hand, are formed and separated, (h) the flow (F') is taken from the hydrocyclone separator and recycled into the polymerization reactor (R), into step (a), (i) the suspension (CS') is taken from the hydrocyclone separator and the polyolefin particles are separated from the suspension (CS').

In the present invention, the term "polyolefin" is intended to denote both the homopolymers of an olefin and the copolymers of an olefin with one or more other olefins or other comonomers that are copolymerizable with the olefin.

The olefin used in the polymerization steps (a) and (e) of the process according to the invention is generally chosen from olefins containing from 2 to 12 carbon atoms, and mixtures thereof. The olefin is preferably chosen from 1-olefins containing from 2 to 8 carbon atoms, more particularly from ethylene, propylene, 1-butene, 1-methylpentene, 1-hexene and 1-octene, and mixtures thereof. The olefin used in the subsequently polymerization reactor (R'), in step (e), is the same as that used in the polymerization reactor (R), in step (a).

It goes without saying that in the polymerizations in steps (a) and (e) of the process according to the invention, besides the olefin, at least one other comonomer that is copolymerizable with the olefin may be used so as to manufacture copolymers. The comonomers are usually chosen from conjugated or unconjugated olefins and diolefins, containing from 2 to 12 atoms. The 1-olefins containing from 2 to 8 carbon atoms as described above give good results. When one or more comonomers are used, it is preferred to use the same comonomer(s) in the polymerization reactors in steps (a) and (e). The amounts of comonomer used in steps (a) and (e) are preferably controlled such that the comonomer/olefin molar ratio in the subsequent polymerization reactor (R'), in step (e), is between 80% and 120% by weight of the comonomer/olefin molar ratio in the polymerization reactor (R), in step (a).

The diluent (D) used in the process according to the invention may be any diluent which is liquid under the polymerization conditions and in which most of the polymer formed is insoluble under the polymerization conditions. Hydrocarbons are suitable diluents. Aromatic and aliphatic cyclic hydrocarbons containing from 5 to 12 carbon atoms, such as toluene and cyclohexane, are suitable. Preferred diluents are acyclic aliphatic hydrocarbons containing from 3 to 8 carbon atoms, such as pentane and hexane. Propane and isobutane are particularly preferred.

According to one particular case, the diluent may be the olefin itself maintained in liquid form under its saturation pressure.

In another particular case, the diluent may be maintained in its supercritical state.

The polymerization carried out in step (a) of the process according to the invention is carried out in the presence of a catalyst. Any catalyst allowing the polymerization of olefins may be used. Examples of such catalysts which may be mentioned are catalysts of the Ziegler type, vanadium-based or chromium-based catalysts, metallocene catalysts and catalysts based on transition metals from groups 8 to 12 of the Periodic Table of the Elements. These catalysts may be supported on an inorganic or polymeric support. Good results have been obtained with a chromium catalyst supported on a support comprising silica.

The polymerization carried out in step (e) of the process according to the invention is preferably carried out without any fresh catalyst being added to the reactor. Specifically, the concentrated suspension (CS) of polyolefin particles introduced into the subsequent polymerization reactor (R') generally still contains enough active catalyst from the reactor (R) to continue the polymerization.

It goes without saying that, in the polymerizations in steps (a) and (e) of the process, besides the olefin(s) and the diluent, other compounds may be present, in particular cocatalysts and agents for regulating the molecular mass, such as hydrogen.

When a cocatalyst is added, it is preferably added only into the polymerization reactor (R), in step (a).

When a regulating agent is added, it is preferable to add the same regulating agent into the polymerization reactors in steps (a) and (e) of the process. The amounts of molecular mass regulating agent are advantageously adjusted such that the regulating agent/olefin molar ratio in the subsequent polymerization reactor (R'), in step (e), is between 80% and 120% of the regulating agent/olefin molar ratio in the polymerization reactor (R), in step (a). Preferably, the regulating agent/olefin molar ratio is substantially the same in the polymerization reactors in steps (a) and (e).

The polymerization carried out in steps (a) and (e) of the process may take place under very variable temperature and pressure conditions. The polymerization is generally carried out at a temperature of from 20° C. to 150° C., preferably from 25° C. to 130° C. Usually, the polymerization is carried out at a pressure of from $10^5$ Pa to $100 \times 10^5$ Pa, preferably from $10 \times 10^5$ Pa to $55 \times 10^5$ Pa.

Usually, the polymerization temperature in step (e) of the process is between 95% and 105% of the polymerization temperature in step (a) of the process according to the invention. Preferably, the difference between the polymerization temperatures in steps (a) and (e) does not exceed 3° C. More particularly, the difference does not exceed 1° C.

The polymerization carried out in step (a) is carried out in the presence of polyolefin particles, recycled into the reactor (R) via the flows (F) and (F'). The amount of polyolefin particles recycled into the reactor (R) is generally at least 1% by weight relative to the total weight of polyolefin particles taken from the reactor (R). The amount of particles recycled is usually at least 10%, preferably at least 20%, by weight, relative to the total weight of particles taken from the reactor (R). The amount of particles recycled into the reactor (R) generally does not exceed 95% and preferably does not exceed 60% by weight relative to the total weight of particles taken from the reactor (R).

According to one variant of the process according to the invention, the polymerization carried out in step (a) is carried out in several polymerization reactors connected in series. In this case, the suspension (S) taken from the final reactor of this series of polymerization reactors is transferred into step (b). The suspensions obtained from each reactor preceding the final reactor of the series may be taken and transferred into the next reactor in any known manner. To this end, it may be advantageous also to use hydrocyclone separators. When step (a) is carried out in several reactors in series, the flow (F) may be recycled into the final reactor of this series of polymerization reactors. According to one advantageous embodiment, the flow (F) is recycled into a polymerization reactor preceding this final reactor.

In step (b) of the process according to the invention, a portion of the suspension (S) formed in the reactor (R) in step (a) is taken from this reactor. The amount of suspension taken from the reactor (R) can vary within a wide range. Generally, the amount of suspension taken from the reactor (R) is adjusted so as to correspond to the production of polymer.

In step (b), the suspension is preferably taken continuously from the polymerization reactor (R).

In step (c) of the process according to the invention, the suspension taken from the reactor (R) in step (b) is transferred into a hydrocyclone separator in which a concentrated suspension (CS) of polyolefin particles, on the one hand, and a flow (F) comprising polyolefin particles and diluent (D), on the other hand, are formed and separated.

For the purposes of the present invention, the term "hydrocyclone separator" is intended to denote any apparatus which, under the action of a centrifugal force, makes it possible to separate from a suspension of solid particles, on the one hand a liquid flow depleted in solid particles, and on the other hand a flow concentrated in solid particles. Such items of apparatus are well known and are described in particular in Perry's Chemical Engineers' Handbook, McGraw-Hill 7th Edition, 1997, pages 19–24 to 19–28. It goes without saying that in the process according to the invention, several hydrocyclone separators may be mounted in series.

The pressure and temperature values in the hydrocyclone separator are generally adjusted such that most of the diluent present remains in liquid form. Preferably, the pressure and temperature are of the order of magnitude of those prevailing in the polymerization reactor preceding the hydrocyclone separator.

The functioning of the hydrocyclone separator is generally adjusted such that the flow (F) recycled into the reactor (R), in step (a), comprises from 0.5% to 90% by weight of polyolefin particles relative to the total weight of polyolefin particles present in the suspension taken from the reactor (R) in step (b). The functioning of the hydrocyclone separator may be adjusted by means of control valves mounted on the pipes for taking the flow (F) and the concentrated suspension (CS) from the hydrocyclone separator. Good results have been obtained by adjusting the functioning of the hydrocyclone separator such that the flow (F) recycled into the reactor (R) comprises at least 5% by weight, preferably at least 10% by weight, of polyolefin particles relative to the total weight of polyolefin particles present in the suspension taken from the reactor (R). The amount of polyolefin particles recycled into the reactor (R) in step (a) preferably does not exceed 50% by weight, more particularly 30% by weight, of the total weight of the polyolefin particles present in the suspension taken from the reactor (R).

In step (d) of the process according to the invention, the flow (F) is taken from the hydrocyclone separator and recycled into the polymerization reactor (R). The flow (F) generally contains the finest particles, i.e. those which contain the least amount of polymer. Recycling them into the polymerization reactor (R) makes it possible to increase their residence time in the polymerization reactor so as to monitor the polymerization and to increase their size. The flow (F) may comprise, in addition to the diluent and the polyolefin particles, other compounds present or formed in the polymerization reactor. Generally, the flow (F) comprises compounds present or formed in the reactor which are soluble in the diluent. The flow (F) usually comprises olefin.

In step (e) of the process according to the invention, the concentrated suspension (CS) is taken from the hydrocyclone separator and transferred into a subsequent polymerization reactor (R') into which at least one olefin is added to continue the polymerization.

It may be advantageous to add to the subsequent polymerization reactor (R') an additional amount of diluent (D) as defined above. According to one variant of the process according to the invention, this amount of diluent is added to the concentrated suspension before it enters the subsequent polymerization reactor (R').

According to one variant of the process according to the invention, the polymerization carried out in step (e) is carried out in several polymerization reactors connected in series. In this case, the suspension (S') taken from the final reactor of this series of polymerization reactors is transferred into step (f). The suspensions obtained from each reactor preceding this final polymerization reactor may be taken and transferred into the next reactor in any known manner. To this end, it may be advantageous also to use hydrocyclone separators.

After step (e) of the process according to the invention, a suspension (S') comprising diluent (D) and polyolefin particles is obtained.

The respective amounts of polyolefin manufactured in steps (a) and (e) of the process according to the invention may vary within a wide range. Generally, the amount of polyolefin manufactured in step (a) of the process is between 20% and 80% by weight, preferably between 30% and 70% by weight, of the total amount of polyolefin produced in the process according to the invention. Generally, the amount of polyolefin manufactured in step (e) of the process is between 20% and 80% by weight, preferably between 30% and 70% by weight, of the total amount of polyolefin produced in the process according to the invention.

In step (i) of the process according to the invention, a portion of the suspension (S') present in the reactor (R') is taken from the reactor. The amount of suspension taken from the reactor (R') may vary within a wide range. Generally, the amount of suspension taken from the reactor (R') is adjusted so as to obtain in the concentrated suspension (CS') an amount of polyolefin particles which corresponds to the total production of polymer.

In step (f), the suspension is preferably taken continuously from the polymerization reactor (R').

In step (g) of the process according to the invention, the suspension taken from the reactor (R') in step (f) is transferred into a hydrocyclone separator in which a concentrated suspension (CS') of polyolefin particles, on the one hand, and a flow (F') comprising polyolefin particles and diluent (D), on the other hand, are formed and separated.

The functioning of the hydrocyclone separator is generally adjusted such that the flow (F') recycled into the reactor (R), in step (a), comprises from 0.5% to 90% by weight of polyolefin particles relative to the total weight of polyolefin particles present in the suspension taken from the reactor (R') in step (f). Good results were obtained by adjusting the functioning of the hydrocyclone separator such that the flow (F') recycled into the reactor (R) comprises at least 5% by weight, preferably at least 10% by weight, of polyolefin particles relative to the total weight of polyolefin particles present in the suspension taken from the reactor (R'). The amount of polyolefin particles recycled into the reactor (R) in step (a) preferably does not exceed 50% by weight, more particularly 30% by weight, of the total weight of polyolefin particles present in the suspension taken from the reactor (R').

The pressure and temperature values in the hydrocyclone separator are generally adjusted such that most of the diluent present remains in liquid form. The pressure and temperature are preferably of the order of magnitude of those prevailing in the polymerization reactor preceding the hydrocyclone separator.

In step (h) of the process according to the invention, the flow (F') is taken from the hydrocyclone separator and recycled into the polymerization reactor (R), i.e. into step (a) of the process. The flow (F') generally contains the finest particles, i.e. those which contain the smallest amount of polymer. Recycling them into the polymerization reactor (R) makes it possible to increase their residence time in the polymerization reactors so as to continue the polymerization and to increase their size. The flow (F') can comprise, besides the diluent and polyolefin particles, other compounds present or formed in the process. The flow (F') generally comprises compounds that are soluble in the diluent. The flow (F') usually comprises olefin. In particular, when step (a) is carried out in several polymerization reactors connected in series, the flow (F') may be recycled into the final polymerization reactor of this series. According to one advantageous embodiment, the flow (F') is recycled into a polymerization reactor preceding the final reactor of this series.

In step (i) of the process according to the invention, the concentrated suspension (CS') is taken from the hydrocyclone separator and the polyolefin particles present therein are separated from the suspension (CS'). The polyolefin particles may be separated out by any known method. The polymer particles are generally separated from the majority of the diluent by subjecting the concentrated suspension (CS') obtained from step (g) of the process according to the invention to a treatment under pressure and temperature conditions that are capable of evaporating at least some of the diluent. The polymer particles now containing only a small amount of residual diluent may then be dried by any known means, for example by heating in a drier.

According to a first variant of step (i) of the process according to the invention, the concentrated suspension (CS') is subjected to a pressure reduction to a pressure below $5 \times 10^5$ Pa. The diluent evaporated off may then be recondensed by compression in order to be reused in the process according to the invention. Before reusing it, the diluent is usually subjected to a purification so as to remove the majority of the olefin and any other compounds present. After purification, the diluent may be reused in steps (a) and/or (e) of the process according to the invention.

According to a second variant of step (i) of the process according to the invention, the concentrated suspension (CS') is subjected to a pressure reduction under temperature and pressure conditions which ensure the evaporation of most of the diluent, but which are such that the subsequent cooling of the diluent evaporated at a temperature of less than or equal to 60° C. allows it to be recondensed without needing to compress it. The temperature at which the pressure reduction is carried out is generally between 50° C. and 90° C. In order to adjust the temperature at which the pressure reduction is carried out, it may be advantageous to heat the concentrated suspension (CS') taken from the hydrocyclone separator by means of a line heater. The pressure at which the pressure reduction is carried out is generally between $5 \times 10^5$ Pa and $20 \times 10^5$ Pa. This variant of the process has the advantage that the diluent thus separated from the polymer particles may be recondensed by simple cooling without a compression step and may be reused in step (a) and/or (e) of the process according to the invention. This second variant of step (i) of the process is very advantageous when a diluent which has a boiling point at atmospheric pressure of less than about 25° C. is used.

The process according to the invention can be applied to the production of a polyolefin resin. The process according to the invention can advantageously be applied to the production of polyethylene resins. In the present invention, the term "polyethylene" is intended to denote both homopolymers of ethylene and copolymers of ethylene with one or more other comonomers that are copolymerizable with ethylene, as defined above. The process is suitable for obtaining a polyethylene comprising less than 10% by weight, preferably less than 5% by weight, of units derived from another comonomer. Good results have been obtained for the production of a copolymer of ethylene and of units derived from 1-butene and/or 1-hexene.

The process according to the invention has the advantage that it narrows the distribution of the residence times of the various polyolefin particles. The process according to the invention consequently makes it possible to obtain a resin which has good homogeneity. The process especially makes it possible to obtain resins whose polyolefin particle size distribution is narrow. The process according to the invention also makes it possible to obtain resins in which most of the particles have properties very close to the average properties of the resin. The resins obtained in the process according to the invention also have the advantage of containing only a small amount of fine particles, more particularly of particles with a diameter of less 200 µm. In addition, and more especially when a supported chromium-based catalyst is used, the process makes it possible to obtain a very good catalytic yield. The resins thus obtained contain only small amounts of catalytic residues.

The invention also relates to a device for carrying out the process described above, comprising, connected in series, a polymerization reactor (R), a hydrocyclone separator, a circuit for recycling the flow (F) into the reactor (R), a device for removing concentrated suspension (CS), a polymerization reactor (R'), a hydrocyclone separator, a circuit for recycling the flow (F') into the reactor (R) and a device for separating the polyolefin particles from the concentrated suspension (CS').

Any reactor functioning continuously may be used as polymerization reactor, such as reactors of stirred-tank type or reactors of loop type. Good results have been obtained with loop reactors.

In the process according to the invention, the flow (F) may be taken from the hydrocyclone separator and recycled into the reactor (R) by exploiting a pressure difference prevailing in the polymerization reactor (R). More particularly, when the polymerization reactor is a reactor of the loop type, the suspension (S) may be taken from the reactor and the flow (F) may be recycled into the reactor (R) by exploiting the pressure difference prevailing upstream and downstream of the system for stirring the loop reactor. It is preferred, however, to take the flow (F) from the hydrocyclone separator by creating a pressure difference upstream and downstream of the hydrocyclone separator by means of a circulation pump. The pump is preferably mounted on the circuit for recycling the flow (F) into the reactor (R).

In the process according to the invention, the flow (F') may be taken from the hydrocyclone separator and recycled into the reactor (R) by exploiting a pressure difference prevailing between the polymerization reactor (R') and the polymerization reactor (R). It is preferred, however, to take the flow (F') from the hydrocyclone separator by creating a pressure difference upstream and downstream of the hydrocyclone separator by means of a circulation pump. The pump is preferably mounted on the circuit for recycling the flow (F') into the reactor (R).

BRIEF DESCRIPTIONS OF THE DRAWINGS

FIG. 1 shows diagrammatically a device which can be used to carry out the process according to the invention. In the scheme in FIG. 1, a portion of the suspension comprising polyolefin particles and diluent, formed in the polymerization reactor 1, is taken via the pipe 2 and transferred into the hydrocyclone separator 3 in which are formed, on the one hand, a concentrated suspension (CS) of polymer particles which is taken from the hydrocyclone separator 3 via the valve 7 mounted on the pipe 6, and, on the other hand, a flow (F) comprising polymer particles and which is enriched in diluent. This diluent-enriched flow (F) is taken from the hydrocyclone separator 3 via the pipe 4 and recycled into the polymerization reactor 1. The opening of the control valve 5 mounted on the pipe 4 makes it possible to condition the amount of polyolefin particles in the flow (F). The concentrated suspension (CS) taken from the hydrocyclone separator 3 via the pipe 6 is transferred into the polymerization reactor 8 in which the polymerization is continued. Some of the suspension formed in the reactor 8 comprising polyolefin particles and diluent is taken from the reactor 8 via the pipe 9 and transferred into the hydrocyclone separator 10. A concentrated suspension (CS') of polyolefin particles which is taken from the hydrocyclone separator 10 via the pipe 11, on the one hand, and a flow (F') comprising polymer particles and which is enriched in diluent, on the other hand, are formed in the hydrocyclone separator 10. This flow (F') is taken from the hydrocyclone separator 10 via the pipe 13 and recycled into the polymerization reactor 1. The opening of the control valve 14 mounted on the pipe 13 makes it possible to condition the amount of polyolefin particles in the flow (F'), as well as the degree of thickening of the concentrated suspension (CS'). The concentrated suspension (CS') is transferred into a tank 15 maintained at a pressure below that prevailing in the hydrocyclone separator 10 (generally from about $5\times10^5$ Pa to $15\times10^5$ Pa) so as to evaporate therein most of the diluent. To this end, the pipe 11 may optionally be fitted with a pipe-heating device (not shown). The polyolefin particles are taken from the tank 15 via the pipe 16.

EXAMPLE 1

A polymerization test was carried out with the process according to the invention and in the device described in FIG. 1. Ethylene was polymerized continuously in the loop reactor 1 loaded with isobutane, by means of a silica-supported chromium catalyst (catalyst EP30X sold by the company Crossfield), so as to form a suspension comprising about 32% by weight of polyethylene particles. The temperature in the reactor 1 was about 105° C.; the pressure was about $38\times10^5$ Pa. The reactor was fed continuously with ethylene and isobutane at a flow rate of 10 tonnes/h and 3 tonnes/h, respectively. A portion of the suspension of polymer particles formed in the reactor 1 was taken continuously from the reactor 1 via the pipe 2 at a flow rate of 47 tonnes/h. This suspension comprised 32% by weight of polyethylene particles and 68% by weight of isobutane. It was transferred continuously into the hydrocyclone separator 3. The functioning of the hydrocyclone separator was adjusted by means of control valves 5 and 7 so as to obtain, on the one hand, a flow (F) leaving the hydrocyclone separator via the pipe 4 at a flow rate of 5 tonnes/h, and, on the other hand, a concentrated suspension leaving the hydrocyclone separator via the pipe 7 at a flow rate of 42 tonnes/h. The flow (F) was recycled entirely into the polymerization reactor 1; it comprised 20% by weight of polyethylene particles and 80% by weight of isobutane. 90% of the polyethylene particles in the flow (F) had a diameter of less than 200 µm. The concentrated suspension comprised 33% by weight of polymer particles. The concentrated suspension was introduced into a loop reactor 8. The loop reactor 8 was fed continuously with ethylene and isobutane at a flow rate of 10 tonnes/h and 12 tonnes/h, respectively. The temperature in the reactor 8 was about 105° C.; the pressure was about $37\times10^5$ Pa. A portion of the suspension of polyethylene particles was taken continuously from the reactor 8 via the pipe 9 at a flow rate of 64 tonnes/h. This suspension comprised 37.5% by weight of polyethylene particles. This suspension was transferred continuously into the hydrocyclone separator 10. The functioning of the hydrocyclone separator 10 was adjusted by means of control valves 12 and 14 so as to obtain, on the one hand, a flow (F') leaving the hydrocyclone separator 10 via the pipe 13 at a flow rate of 29 tonnes/h, and, on the other hand, a concentrated suspension leaving the hydrocyclone separator 10 via the pipe 11 at a flow rate of 35 tonnes/h. The flow (F') was recycled entirely into the polymerization reactor 1; it comprised 14% by weight of polyethylene particles and 86% by weight of isobutane. The concentrated suspension comprised 57% by weight of polymer particles.

The concentrated suspension was transferred into the tank 15 in order to separate out the polymer particles.

The polyethylene resin obtained had a melt flow index $MI_2$ of 0.93 g/10 min and an Si content (originating from the catalyst) of 68 ppm. It had an average diameter of 450 µm and comprised less than 3% by weight of particles with a diameter of less than 280 µm. The polyethylene resin was fractionated by screening and the fractions of particles of different diameter were analysed. The results are given in Table I.

The polyethylene resin obtained had a melt flow index $MI_2$ of 0.95 g/10 min and an Si content (originating from the catalyst) of 65 ppm. It had an average diameter of 420 µm. The polyethylene resin was fractionated by screening and the fractions of particles of different diameter were analysed. The results are given in Table I.

EXAMPLE 3 (not in accordance with the invention)

The process described in Example 2 was repeated, except that the transfer into the hydrocyclone separator 3 was omitted.

The polyethylene resin obtained had a melt flow index $MI_2$ of 0.90 g/10 min and an Si content (originating from the catalyst) of 75 ppm. It had an average diameter of 430 µm. The polyethylene resin was fractionated by screening and the fractions of particles of different diameter were analysed. The results are given in Table I.

TABLE I

|  | Example 1 | | | Example 2R | | | Example 3R | | |
| --- | --- | --- | --- | --- | --- | --- | --- | --- | --- |
| Particle size (µ) | % by weight | $MI_2$ (g/10 min) | Si content (ppm) | % by weight | $MI_2$ (g/10 min) | Si content (ppm) | % by weight | $MI_2$ (g/10 min) | Si content (ppm) |
| <125 | 0 | — | — | 0 | — | — | 0.6 | — | — |
| 125–200 | 0 | — | — | 1.2 | 1.30 | 520 | 3.0 | 1.60 | 550 |
| 200–280 | 2.0 | 1.52 | 350 | 3.5 | 1.20 | 440 | 7.0 | 1.45 | 460 |
| 280–350 | 4.5 | 1.47 | 120 | 6.3 | 1.25 | 250 | 12.0 | 1.25 | 250 |
| 350–430 | 10.0 | 1.23 | 95 | 15.0 | 1.10 | 85 | 12.5 | 1.12 | 125 |
| 430–510 | 62.0 | 0.95 | 58 | 38.0 | 0.97 | 55 | 21.2 | 0.99 | 76 |
| 510–620 | 18.0 | 0.80 | 45 | 23.0 | 0.75 | 45 | 18.6 | 0.85 | 74 |
| 620–730 | 3.0 | 0.65 | 30 | 8.0 | 0.72 | 42 | 10.5 | 0.66 | 40 |
| 730–850 | 0.5 | 0.60 | 27 | 3.5 | 0.65 | 21 | 9.3 | 0.69 | 38 |
| >850 | 0 | — | — | 1.5 | — | — | 5.3 | — | — |

EXAMPLE 2 (not in accordance with the invention)

A polyethylene resin having the same average properties ($MI_2$, Si content, average particle size) as the resin manufactured in the process described in Example 1 was manufactured in a device comprising only one loop reactor and only one hydrocyclone separator. Ethylene was polymerized continuously in the loop reactor loaded with isobutane, by means of the catalyst of Example 1, so as to form a suspension comprising about 50% by weight of polyethylene particles. The temperature in the reactor was about 105° C.; the pressure was about $38 \times 10^5$ Pa. The reactor was fed continuously with ethylene and isobutane at a flow rate of 13 tonnes/h and 10.4 tonnes/h, respectively. A portion of the suspension of polymer particles formed in the reactor was taken continuously from the reactor. This suspension comprised 50% by weight of polyethylene particles and 50% by weight of isobutane. It was transferred continuously into the hydrocyclone separator. The functioning of the hydrocyclone separator was adjusted so as to obtain, on the one hand, a flow (F) leaving the hydrocyclone separator at a flow rate of 5.2 tonnes/h, and, on the other hand, a concentrated suspension leaving the hydrocyclone separator at a flow rate of 23.4 tonnes/h. The flow (F) was recycled entirely into the polymerization reactor; it comprised 25% by weight of polyethylene particles and 75% by weight of isobutane. The concentrated suspension comprised 56% by weight of polymer particles. The concentrated suspension was introduced directly into the tank 15 in order to separate out the polymer particles.

Comparison of Example 1 with the Comparative Examples 2 and 3 shows that the process according to the invention makes it possible to obtain a resin having a markedly narrower particle size distribution and a markedly reduced content of fine particles. Moreover, the weight distribution of the properties, such as the content of catalytic residues and the melt flow index $MI_2$, is narrower for the resins obtained according to Example 1.

EXAMPLE 4

A polymerization test was carried out with the process according to the invention and in the device described in FIG. 1. Ethylene was polymerized continuously in the loop reactor 1 loaded with isobutane, by means of a silica-supported chromium catalyst (catalyst EP30X sold by the company Crossfield), so as to form a suspension comprising about 50% by weight of polyethylene particles. The temperature in the reactor 1 was about 106.5° C.; the pressure was about $38 \times 10^5$ Pa. The reactor was fed continuously with ethylene and isobutane at a flow rate of 9 tonnes/h and 3 tonnes/h, respectively. A portion of the suspension of polymer particles formed in the reactor 1 was taken continuously from the reactor 1 via the pipe 2 at a flow rate of 24 tonnes/h. This suspension comprised 50% by weight of polyethylene particles and 50% by weight of isobutane. It was transferred continuously into the hydrocyclone separator 3. The functioning of the hydrocyclone separator was adjusted by means of control valves 5 and 7 so as to obtain, on the one hand, a flow (F) leaving the hydrocyclone separator via the pipe 4 at a flow rate of 6 tonnes/h, and, on the other hand, a concentrated suspension leaving the hydrocyclone separator via the pipe 7 at a flow rate of 18 tonnes/h. The flow (F) was recycled entirely into the polymerization reactor 1; it comprised 33% by weight of polyethylene particles and 67% by weight of isobutane. 90% of the polyethylene particles in the flow (F) had a diameter of less than 200 μm. The concentrated suspension comprised 56% by weight of polymer particles. The concentrated suspension was introduced into a loop reactor 8. The loop reactor 8 was fed continuously with ethylene and isobutane at a flow rate of 10 tonnes/h and 12 tonnes/h, respectively. The temperature in the reactor 8 was about 106.5° C.; the pressure was about $37 \times 10^5$ Pa. A portion of the suspension of polyethylene particles was taken continuously from the reactor 8 via the pipe 9 at a flow rate of 40 tonnes/h. This suspension comprised 50% by weight of polyethylene particles. This suspension was transferred continuously into the hydrocyclone separator 10. The functioning of the hydrocyclone separator 10 was adjusted by means of control valves 12 and 14 so as to obtain, on the one hand, a flow (F') leaving the hydrocyclone separator 10 via the pipe 13 at a flow rate of 6 tonnes/h, and, on the other hand, a concentrated suspension leaving the hydrocyclone separator 10 via the pipe 11 at a flow rate of 34 tonnes/h. The flow (F') was recycled entirely into the polymerization reactor 1; it comprised 17% by weight of polyethylene particles and 83% by weight of isobutane. The concentrated suspension comprised 56% by weight of polymer particles.

The concentrated suspension was conveyed into the tank 15 in order to separate out the polymer particles.

The polyethylene resin obtained had a melt flow index $MI_2$ of 0.95 g/10 min and an Si content (originating from the catalyst) of 40 ppm. It had an average diameter of 510 μm and comprised less than 3% by weight of particles with a diameter of less than 280 μm.

This example shows that the process according to the invention makes it possible to obtain an improvement in the catalytic yield and, consequently, resins comprising fewer catalytic residues.

EXAMPLE 5

A polymerization test was carried out with the process according to the invention and in the device described in FIG. 1. Ethylene was copolymerized continuously with 1-hexene in the loop reactor 1 loaded with isobutane, by means of a silica-supported chromium catalyst (Cogel sold by Grace), so as to form a suspension comprising about 33% by weight of polyethylene particles. The temperature in the reactor 1 was about 88° C.; the pressure was about $38 \times 10^5$ Pa. The reactor was fed continuously with ethylene, 1-hexene and isobutane at a flow rate of 10 tonnes/h, 0.32 tonne/h and 3 tonnes/h, respectively. A portion of the suspension of polymer particles formed in the reactor 1 was taken continuously from the reactor 1 via the pipe 2 at a flow rate of 47.25 tonnes/h. This suspension comprised 31.7% by weight of polymer particles, 0.5% by weight of 1-hexene and 67.8% by weight of isobutane. The polymer comprised about 3% by weight of hexene. The suspension was transferred continuously into the hydrocyclone separator 3. The functioning of the hydrocyclone separator was adjusted by means of the control valves 5 and 7 so as to obtain, on the one hand, a flow (F) leaving the hydrocyclone separator via the pipe 4 at a flow rate of 5.03 tonnes/h, and, on the other hand, a concentrated suspension leaving the hydrocyclone separator via the pipe 7 at a flow rate of 42.22 tonnes/h. The flow (F) was recycled entirely into the polymerization reactor 1; it comprised 25% by weight of polyethylene particles (copolymer comprising 3% by weight of units derived from hexene), 0.5% by weight of 1-hexene and 74.5% by weight of isobutane. The concentrated suspension comprised 33.2% by weight of polymer particles. The concentrated suspension was introduced into a loop reactor 8. The loop reactor 8 was fed continuously with ethylene, 1-hexene and isobutane at a flow rate of 10 tonnes/h, 0.40 tonne/h and 12 tonnes/h, respectively. The temperature in the reactor 8 was about 88° C.; the pressure about $37 \times 10^5$ Pa. A portion of the suspension of polyethylene particles was taken continuously from the reactor 8 via the pipe 9 at a flow rate of 64.32 tonnes/h. This suspension comprised 37.3% by weight of polymer particles. This suspension was transferred continuously into the hydrocyclone separator 10. The functioning of the hydrocyclone separator 10 was adjusted by means of the control valves 12 and 14 so as to obtain, on the one hand, a flow (F') leaving the hydrocyclone separator via the pipe 13 at a flow rate of 29.2 tonnes/h, and, on the other hand, a concentrated suspension leaving the hydrocyclone separator 10 via the pipe 11 at a flow rate of 35.12 tonnes/h. The flow (F') was recycled entirely into the polymerization reactor 1; it comprised 13.6% by weight of polymer particles, 0.5% by weight of 1-hexene and 85.9% by weight of isobutane. The concentrated suspension comprised 56.9% by weight of polymer particles.

The concentrated suspension was transferred into the tank 15 in order to separate out the polymer particles.

The final polymer comprised about 3% by weight of hexene, which shows that the polymer produced in the reactor 8 had an incorporation of hexene similar to that produced in the reactor 1. The polyethylene resin obtained had a melt flow index $MI_5$ of 0.55 g/10 min and an Si content (originating from the catalyst) of 76 ppm. It had an average diameter of 469 μm. The polyethylene resin was fractionated by screening and the fractions of particles of different diameter were analysed. The results are given in Table II.

EXAMPLE 6R (not in accordance with the invention)

A copolymer of ethylene and of 1-hexene having the same properties (in particular hexene content, melt flow index, mean particle size, content of catalytic residues, etc.) as the copolymer produced in Example 5 was produced in the device as described in Comparative Example 2R, comprising a single loop reactor and a single hydrocyclone separator. This resin was fractionated by screening and the fractions of particles of different diameter were analysed. The results are given in Table II.

EXAMPLE 7R (not in accordance with the invention)

A copolymer of ethylene and of 1-hexene having the same properties (in particular hexene content, melt flow index, mean particle size, content of catalytic residues, etc.) as the copolymer produced in Example 5 was produced in the device as described in Comparative Example 3R, comprising a single loop reactor.

This resin was fractionated by screening and the fractions of particles of different diameter were analysed. The results are given in Table II.

TABLE II

| Particle size (μ) | Example 5 | | | Example 6R | | | Example 7R | | |
| --- | --- | --- | --- | --- | --- | --- | --- | --- | --- |
| | % by weight | MI$_2$ (g/10 min) | Si content (ppm) | % by weight | MI$_2$ (g/10 min) | Si content (ppm) | % by weight | MI$_2$ (g/10 min) | Si content (ppm) |
| <125 | 0.0 | — | — | 0.0 | — | — | 0.1 | — | — |
| 125–200 | 0.0 | — | — | 0.6 | 1.30 | 580 | 2.8 | 0.98 | 650 |
| 200–280 | 0.6 | 0.85 | 400 | 3.1 | 0.95 | 430 | 7.2 | 0.93 | 475 |
| 280–350 | 2.7 | 0.87 | 210 | 6.7 | 0.79 | 270 | 10.9 | 0.85 | 225 |
| 350–430 | 12.0 | 0.82 | 135 | 13.9 | 0.78 | 112 | 13.0 | 0.75 | 125 |
| 430–510 | 65.8 | 0.65 | 76 | 40.7 | 0.58 | 54 | 19.6 | 0.60 | 75 |
| 510–620 | 16.9 | 0.38 | 45 | 21.4 | 0.43 | 52 | 20.1 | 0.40 | 40 |
| 620–730 | 1.3 | 0.30 | 40 | 6.7 | 0.26 | 35 | 12.8 | 0.23 | 25 |
| 730–850 | 0.5 | 0.15 | 26 | 4.5 | 0.23 | 22 | 8.6 | 0.10 | 20 |
| >850 | 0.1 | — | — | 2.5 | — | — | 4.7 | — | — |

Although the resins produced in Examples 5, 6R and 7R have the same average characteristics, the resin obtained by the process according to the invention comprises markedly fewer fine particles. Moreover, the resin obtained by the process according to the invention is markedly more homogeneous.

What is claimed is:

1. Continuous process for manufacturing a polyolefin resin of improved homogeneity, according to which:
    (a) in a polymerization reactor (R) comprising a diluent (D), an olefin is polymerized continuously in the presence of a catalyst to produce a suspension (S) comprising the said diluent (D) and polyolefin particles,
    (b) a portion of the suspension (S) is taken from the reactor (R),
    (c) the suspension taken is transferred into a hydrocyclone separator in which a flow (F) comprising diluent (D) and polyolefin particles, on the one hand, and a concentrated suspension (CS) of polyolefin particles, on the other hand, are formed and separated,
    (d) the flow (F) is taken from the hydrocyclone separator and recycled into the polymerization reactor (R), into step (a),
    (e) the concentrated suspension (CS) is taken from the hydrocyclone separator and introduced into a subsequent polymerization reactor (R'), fed with olefin to continue the polymerization and to produce a suspension (S') comprising the diluent (D) and polyolefin particles,
    (f) a portion of the suspension (S') is taken from the subsequent polymerization reactor (R'),
    (g) the suspension taken is transferred to a hydrocyclone separator in which a flow (F') comprising diluent (D) and polyolefin particles, on the one hand, and a concentrated suspension (CS') of polyolefin particles, on the other hand, are formed and separated,
    (h) the flow (F') is taken from the hydrocyclone separator and recycled into the polymerization reactor (R), into step (a),
    (i) the suspension (CS') is taken from the hydrocyclone separator and the polyolefin particles are separated from the suspension (CS').

2. Process according to claim 1, in which the flow (F) recycled into the polymerization reactor (R) comprises from 0.5% to 90% by weight of polyolefin particles relative to the weight of polyolefin particles present in the suspension taken from the reactor (R) in step (b).

3. Process according to claim 1, in which the flow (F') recycled into the polymerization reactor (R) comprises from 0.5% to 90% by weight of polyolefin particles relative to the weight of polyolefin particles present in the suspension taken from the subsequent reactor (R') in step (f).

4. Process according to claim 1, wherein, besides the olefin, at least one other comonomer that is copolymerizable with the olefin is used in the polymerization reactors in steps (a) and (e).

5. Process according to claim 4, wherein the comonomer/olefin molar ratio in the polymerization reactor (R') is between 80% and 120% of the comonomer/olefin molar ratio in the polymerization reactor (R).

6. Process according to claim 1, wherein an agent for regulating the molecular mass is used in the polymerization reactors in steps (a) and (e).

7. Process according to claim 6, wherein the regulating agent/olefin molar ratio in the polymerization reactor (R') is between 80% and 120% of the regulating agent/olefin molar ratio in the polymerization reactor (R).

8. Process according to claim 1, wherein the polymerization temperature in step (e) of the process is between 95% and 105% of the polymerization temperature in step (a).

9. Process according to claim 1, wherein, in step (i), the suspension (CS') obtained from step (g) is subjected to a treatment under temperature and pressure conditions which ensure the evaporation of at least some of the diluent (D).

10. Process according to claim 1, applied to the preparation of a polyethylene comprising less than 10% by weight of units derived from another comonomer.

11. Process according to claim 10, characterized in that the comonomer is 1-butene and/or 1-hexene.

12. Device for carrying out the process according to claim 1, comprising, connected in series, a polymerization reactor (R), a hydrocyclone separator, a circuit for recycling the flow (F) into the reactor (R), a device for removing concentrated suspension (CS), a polymerization reactor (R'), a hydrocyclone separator, a circuit for recycling the flow (F') into the reactor (R) and a device for separating the polyolefin particles from the concentrated suspension (CS').

13. Device according to claim 12, comprising a circulation pump mounted on the circuit for recycling the flow (F) into the reactor (R).

14. Device according to claim 12, comprising a circulation pump mounted on the circuit for recycling the flow (F') into the reactor (R).

* * * * *